United States Patent
Yuan et al.

(10) Patent No.: US 11,093,073 B2
(45) Date of Patent: Aug. 17, 2021

(54) TOUCH CONTROL CHIP, TOUCH DETECTION METHOD, TOUCH DETECTION SYSTEM AND ELECTRONIC DEVICE

(71) Applicant: SHENZHEN GOODIX TECHNOLOGY CO., LTD., Shenzhen (CN)

(72) Inventors: Guangkai Yuan, Shenzhen (CN); Hong Jiang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/823,320

(22) Filed: Mar. 18, 2020

(65) Prior Publication Data
US 2020/0285368 A1 Sep. 10, 2020

Related U.S. Application Data

(63) Continuation of application No. PCT/CN2019/077437, filed on Mar. 8, 2019.

(51) Int. Cl.
*G06F 3/041* (2006.01)

(52) U.S. Cl.
CPC ........ *G06F 3/04164* (2019.05); *G06F 3/0412* (2013.01); *G06F 2203/04103* (2013.01)

(58) Field of Classification Search
CPC ............... G06F 3/04164; G06F 3/0412; G06F 2203/04103
See application file for complete search history.

(56) References Cited

U.S. PATENT DOCUMENTS

| 2009/0040149 | A1 | 2/2009 | Nishinohara | |
| 2011/0074705 | A1* | 3/2011 | Yousefpor | G06F 1/16 345/173 |
| 2011/0193820 | A1* | 8/2011 | Chen | G06F 3/041661 345/174 |

(Continued)

FOREIGN PATENT DOCUMENTS

| CN | 103018994 A | 4/2013 |
| CN | 103853402 A | 6/2014 |

(Continued)

*Primary Examiner* — Sejoon Ahn
(74) *Attorney, Agent, or Firm* — Brion Raffoul

(57) ABSTRACT

A touch control chip, a touch detection method, a touch detection system and an electronic device, and the touch chip includes: a synchronization module, a touch drive module, and a touch detection module. The synchronization module is electrically connected to a display drive chip, to enable touch driving performed by the touch drive module to have an association relationship with a display control signal of the display drive chip; the synchronization module is electrically connected to the touch drive module, to enable the touch drive module to drive a touch sensor under control of the display control signal; and the touch detection module is electrically connected to the touch sensor, to detect an output signal of the touch sensor to determine a touch position. The touch detection system cancels or reduces interference from a display system, thereby improving the signal-to-noise ratio of the touch detection system.

3 Claims, 4 Drawing Sheets

(56) References Cited

U.S. PATENT DOCUMENTS

| | | | |
|---|---|---|---|
| 2011/0210927 A1* | 9/2011 | Mizuhashi | G06F 3/0447 |
| | | | 345/173 |
| 2015/0212644 A1 | 7/2015 | Noto | |
| 2018/0173336 A1* | 6/2018 | Karuppusamy | G06F 3/0445 |
| 2021/0072865 A1* | 3/2021 | He | G06F 3/0443 |
| 2021/0073504 A1* | 3/2021 | Shih | G09G 3/20 |

FOREIGN PATENT DOCUMENTS

| | | |
|---|---|---|
| CN | 104965627 A | 10/2015 |
| CN | 109960441 A | 7/2019 |

* cited by examiner

TOUCH CONTROL CHIP, TOUCH DETECTION METHOD, TOUCH DETECTION SYSTEM AND ELECTRONIC DEVICE

CROSS-REFERENCE TO RELATED APPLICATION

The present disclosure is a continuation of International Application No. PCT/CN2019/077437, filed on Mar. 8, 2019, which is hereby incorporated by reference in its entirety.

TECHNICAL FIELD

Embodiments of the present disclosure relate to the field of touch technology, and specifically to a touch chip, a touch detection method, a touch detection system and an electronic device.

BACKGROUND

For an electronic device having both a display system and a touch detection system, since some conductive electrodes in the display system often have certain distances from some conductive electrodes in the touch detection system, thus forming some specific capacitors. Especially for a portable mobile terminal, the development trend featuring lightness and thinness has made the distance between the conductive electrodes in the display system and the conductive electrodes in the touch detection system smaller and smaller, as a result, the capacitance value of the capacitor is often large. For example, for some portable mobile terminals, the distance between the touch sensor in the touch detection system and the display cathode of the display system is only 10 um, which is much smaller than the traditional 100 um, thus causing the capacitance between the display cathode and the touch sensor to be approximately 10 times greater than that in the conventional case, and causing interference from the display system to greatly affect the sensitivity of touch detection.

SUMMARY

In view of this, one of the technical problems addressed by embodiments of the present disclosure is to provide a touch control chip, a touch detection method, a touch detection system and an electronic device to overcome or alleviate the above defects in the prior art.

An embodiment of the present disclosure provides a touch control chip, including: a synchronization module, a touch drive module, and a touch detection module, the synchronization module is electrically connected to a display drive chip, to enable touch driving performed by the touch drive module to have an association relationship with a display control signal of the display drive chip; the synchronization module is electrically connected to the touch drive module, to enable the touch drive module to drive a touch sensor under control of the display control signal; and the touch detection module is electrically connected to the touch sensor, to detect an output signal of the touch sensor to determine a touch position.

Alternatively, in any embodiment of the present disclosure, the touch detection module is further configured to perform differential processing on adjacent output signals of the touch sensor to determine the touch position.

An embodiment of the present disclosure provides a touch detection method, including:

Enabling, by a synchronization module, touch driving performed by a touch drive module to have an association relationship with a display control signal of a display drive chip; and Driving, by the touch drive module, a touch sensor under control of the display control signal, and detecting, by a touch detection module, an output signal of the touch sensor to determine a touch position.

Alternatively, in any embodiment of the present disclosure, if the display control signal include a horizontal synchronization signal, a vertical synchronization signal, and one frame of vertical synchronization signal corresponds to n horizontal synchronization signals, the enabling, by a synchronization module, touch driving performed by a touch drive module to have an association relationship with a display control signal of a display drive chip comprises: enabling, by the synchronization module, the touch driving performed by the touch drive module to have a first association relationship with the vertical synchronization signal, and has a second association relationship with the n horizontal synchronization signals.

Alternatively, in any embodiment of the present disclosure, the touch drive module is further configured to sequentially send m detection codes in one driving period to drive one drive channel in the touch sensor; the first association relationship is: one frame of vertical synchronization signal corresponds to one driving period, and a time point at which the ith detection code starts to be sent in each driving period lags behind a trigger point in time of one frame of vertical synchronization signal corresponding to the driving period; and the second association relationship is: in each driving period, a time point at which the qth detection code starts to be sent is synchronized with a trigger of the jth horizontal synchronization signal in the n horizontal synchronization signals, and a time point at which the q+1th detection code starts to be sent is synchronized with a trigger of the kth horizontal synchronization signal in the n horizontal synchronization signals, $m \geq i \geq 1$, $m \geq q \geq 1$, $j$, $k \leq n$, and $j < k$.

Alternatively, in any embodiment of the present disclosure, the display control signal includes a horizontal synchronization signal, a vertical synchronization signal, and one frame of vertical synchronization signal corresponds to n horizontal synchronization signals, the enabling, by a synchronization module, touch driving performed by a synchronization module to have an association relationship with a display control signal of a display drive chip comprises: enabling, by a synchronization module, the touch driving performed by the touch drive module to have a first association relationship with the vertical synchronization signal, and to have a third association relationship with the jth horizontal synchronization signal in the n horizontal synchronization signals.

Alternatively, in any embodiment of the present disclosure, the touch drive module is further configured to sequentially send m detection codes in one driving period to drive one drive channel in the touch sensor; the first association relationship is: one frame of vertical synchronization signal corresponds to one driving period, and a time point at which the ith detection code starts to be sent in each driving period lags behind a trigger point in time of one frame of vertical synchronization signal corresponding to the driving period; the third association relationship is: in each driving period, a time point at which the qth detection code starts to be sent is synchronized with a trigger of the jth horizontal synchronization signal in the n horizontal synchronization signals;

and in each driving period, time points at which detection codes other than the qth detection code start to be sent are synchronized with a clock signal of the touch chip, $m \geq i \geq 1$, $m \geq q \geq 1$, and $j \leq n$.

Alternatively, in any embodiment of the present disclosure, the display control signal is a vertical synchronization signal, the enabling, by a synchronization module, touch driving performed by a touch drive module to have an association relationship with a display control signal of a display drive chip comprises: enabling, by the synchronization module, the touch driving performed by the touch drive module to have a fourth association relationship with the vertical synchronization signal.

Alternatively, in any embodiment of the present disclosure, the touch drive module is further configured to sequentially send m detection codes in one driving period to drive one drive channel in the touch sensor; the fourth association relationship is: one frame of vertical synchronization signal corresponds to one driving period, and a time point at which the ith detection code starts to be sent in each driving period is synchronized with a trigger of one frame of vertical synchronization signal corresponding to the driving period; and in each driving period, time points at which detection codes other than the ith detection code start to be sent are synchronized with a clock signal of the touch chip, $m \geq i \geq 1$.

Alternatively, in any embodiment of the present disclosure, the display control signal is n horizontal synchronization signals corresponding to one frame of vertical synchronization signal, the enabling, by a synchronization module, touch driving performed by a touch drive module to have an association relationship with a display control signal of a display drive chip comprises: enabling, by the synchronization module, the touch driving performed by the touch drive module to have a second association relationship with the n horizontal synchronization signals.

Alternatively, in any embodiment of the present disclosure, the touch drive module is further configured to sequentially send m detection codes in one driving period to drive one drive channel in the touch sensor; and the second association relationship is: the n horizontal synchronization signals correspond to one driving period, and in each driving period, a time point at which the ith detection code starts to be sent is synchronized with a trigger of the jth horizontal synchronization signal in the n horizontal synchronization signals, and a time point at which the i+1th detection code starts to be sent is synchronized with a trigger of the kth horizontal synchronization signal in the n horizontal synchronization signals, $i \leq m$, $j$, $k \leq n$, and $j < k$.

Alternatively, in any embodiment of the present disclosure, the detecting an output signal of the touch sensor by a touch detection module to determine a touch position, includes: performing differential processing on adjacent output signals of the touch sensor to determine the touch position.

An embodiment of the present disclosure provides a touch detection system, including the touch chip and the touch sensor according to any embodiment of the present disclosure.

An embodiment of the present disclosure provides an electronic device, including the touch chip according to any embodiment of the present disclosure.

In the technical solution provided by the embodiments of the present disclosure, since the synchronization module enables touch driving performed by the touch drive module to have an association relationship with a display control signal of a display drive chip; and the touch drive module drives a touch sensor under the control of the display control signal, and the touch detection module detects an output signal of the touch sensor to determine a touch position, so that for two consecutive frames of vertical synchronization signals and two driving periods, the detection code and the display control signal have a fixed association relationship. Therefore, when a display system displays content, in order to realize displaying of a display object, usually multiple frames of display images need to be displayed. Therefore, display images of the previous and next frames have the same or at least similar interference. Because touch driving performed by the touch drive module has an association relationship with the display control signal of the display drive chip, if the touch drive module performs touch driving on the touch sensor respectively when displaying the display images of the previous and next frames, output to the touch sensor may be subject to the same or at least similar interference. Therefore, when the touch detection module calculates the touch position, the touch detection module may perform differential processing on adjacent outputs of a data demodulation unit, thereby canceling or reducing interference from the display system, thereby improving the signal-to-noise ratio of the touch detection system, and further improving the sensitivity of touch detection.

BRIEF DESCRIPTION OF THE DRAWINGS

Hereinafter, some specific embodiments of the embodiments of the present disclosure will be described in detail by way of example rather than limiting with reference to the accompanying drawings. The same reference numerals in the accompanying drawings designate the same or similar components or parts. Those skilled in the art should appreciate that these accompanying drawings are not necessarily drawn to scale. In the accompanying drawings.

DETAILED DESCRIPTION OF EMBODIMENTS

In order to implement any technical solution of the embodiments of the present disclosure, it is not necessary to achieve all the above advantages at the same time.

The specific implementation of the embodiments of the present disclosure is further described below with reference to the accompanying drawings of the embodiments of the present disclosure.

Figure 1:
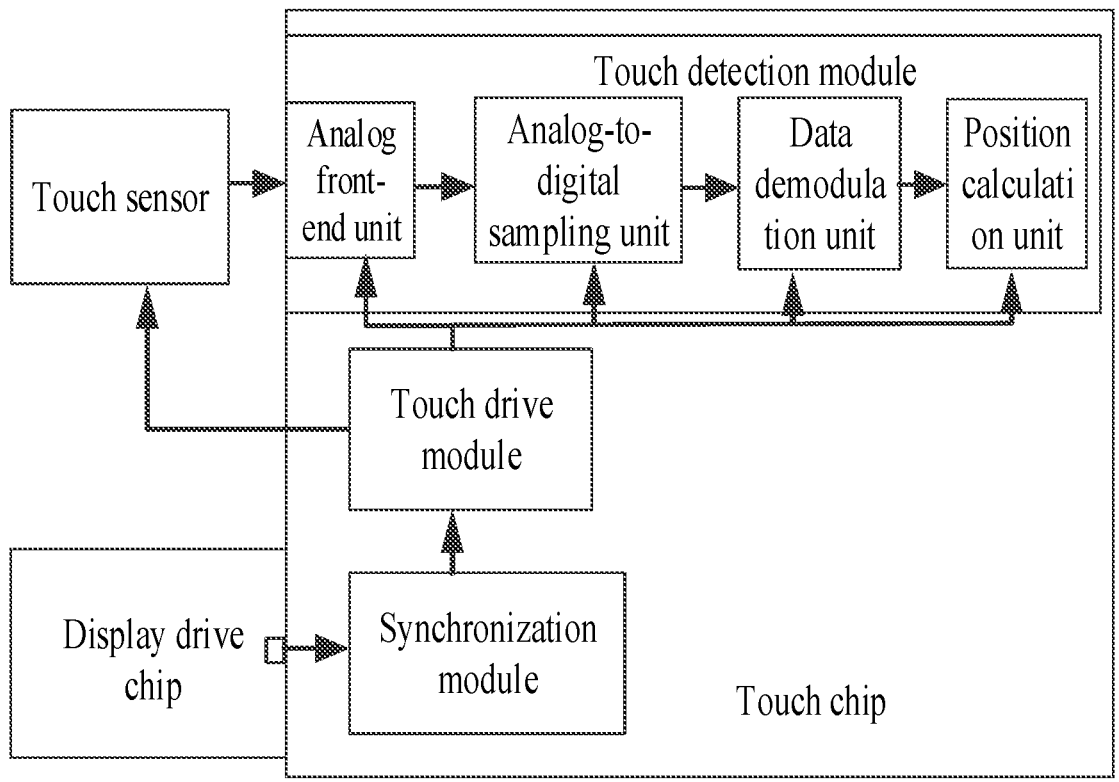
FIG. 1 is a schematic structural diagram of a touch detection system in Embodiment 1 of the present disclosure.

FIG. 1 is a schematic structural diagram of a touch detection system in Embodiment 1 of the present disclosure; as shown in FIG. 1, the system includes: a touch chip and a touch sensor. The touch chip includes: a synchronization module, a touch drive module, and a touch detection module.

The synchronization module is electrically connected to a display drive chip, to enable touch driving performed by the touch drive module has an association relationship with a display control signal of the display drive chip. The synchronization module is electrically connected to the touch drive module, to enable the touch drive module to drive the touch sensor under the control of the display control signal. Specifically, the synchronization module is further configured to detect the display control signal of the display drive chip, and if detected, transmit a drive control signal to the touch drive module to start the touch drive module to drive the touch sensor.

In the present embodiment, the display control signal includes at least one of a horizontal synchronization signal (referred to as Hsync in the industry), a vertical synchronization signal (referred to as Vsync in the industry), a pixel synchronization clock signal (referred to as PCLK in the industry), or a tear effect signal (referred to as TE in the industry). Of course, according to the principles of the embodiments of the present disclosure, the display control signal is not limited to the horizontal synchronization signal (referred to as Hsync in the industry), the vertical synchronization signal (referred to as Vsync in the industry), the pixel synchronization clock signal (referred to as PCLK in the industry), or the tear effect signal (referred to as TE in the industry), and may also include any other signal related to display control, as long as it may synchronously associate the touch driving with the touch drive module. As long as touch driving performed by the touch drive module has an associated relationship with the display control signal of the display drive chip, noise applied by a display system including the display drive chip to the touch detection system is relatively synchronized.

The touch detection module is electrically connected to the touch sensor, to detect an output signal of the touch sensor to determine a touch position. The touch detection module may specifically include:

an analog front-end unit (referred to as AFE), configured to filter and/or amplify the detected output signal of the touch sensor;

an analog-to-digital sampling unit (A/D sampling unit), configured to perform analog-to-digital conversion on an output signal of an analog front-end module;

a data demodulation unit, configured to demodulate an output signal of an analog-to-digital sampling module, and the demodulation may specifically be based on orthogonal demodulation (I/Q); and a position calculation unit, configured to calculate a touch position based on an output signal of a data demodulation module, that is, calculate the touch position based on a demodulation value obtained by the data demodulation unit.

Of course, here, it is explained that, in the present embodiment, the touch detection module including an analog front-end unit, an analog-to-digital sampling unit, a data demodulation unit, and a position calculation unit is merely an example. In practice, the touch detection module may include only a part of the circuit units, or may include more circuit units.

In the present embodiment, when the display system displays content, in order to realize displaying of a display object, usually multiple frames of display images need to be displayed. Therefore, display images of the previous and next frames have the same or at least similar interference. Because touch driving performed by the touch drive module has an association relationship with the display control signal of the display drive chip, if the touch drive module performs touch driving on the touch sensor respectively when displaying the display images of the previous and next frames, output to the touch sensor may be subject to the same or at least similar interference. Therefore, when the touch detection module calculates the touch position, the touch detection module may perform differential processing on adjacent output signals of the touch sensor, thereby canceling or reducing interference from the display system, thereby improving the signal-to-noise ratio of the touch detection system, and further improving the sensitivity of touch detection.

Further, as described above, if the touch detection module includes the above data demodulation unit, output data of the analog-to-digital sampling unit for the display images of the previous and next frames may be demodulated to obtain demodulated data, differential processing may be further performed on the adjacent demodulated data to cancel or reduce interference from an interference system, and the touch position may be further calculated based on the demodulated data after the difference.

Figure 2:
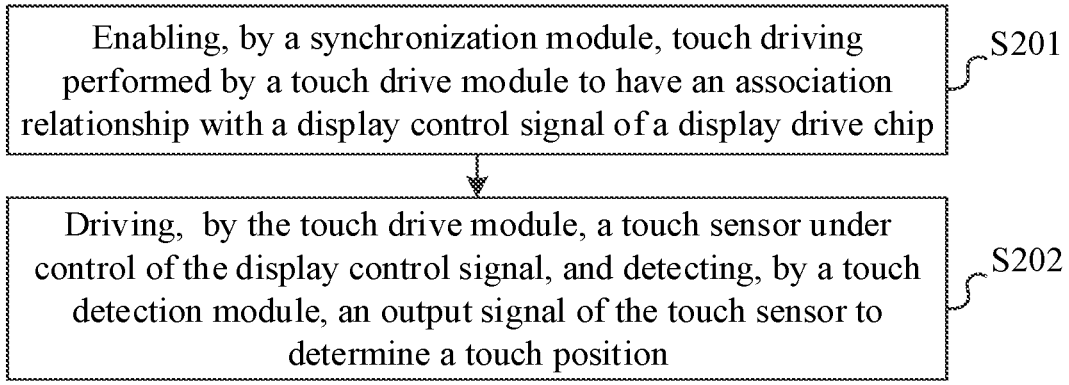
FIG. 2 is a schematic flowchart of a touch detection method in Embodiment 2 of the present disclosure.

Corresponding to the above touch detection system, as shown in FIG. 2, is a schematic flowchart of a touch detection method in Embodiment 2 of the present disclosure; and the method includes the following steps:

S201, enabling, by a synchronization module, touch driving performed by a touch drive module to have an association relationship with a display control signal of a display drive chip; and S202, driving, by the touch drive module, a touch sensor under control of the display control signal, and detecting, by a touch detection module, an output signal of the touch sensor to determine a touch position.

As described above, in step S202, when the touch detection module detects the output signal of the touch sensor to determine the touch position, it may specifically perform differential processing on adjacent output signals of the touch sensor to determine the touch position.

The following provides several specific embodiments to explain by way of example how to specifically implement that touch driving performed by the touch drive module has an association relationship with the display control signal of the display drive chip in the touch detection system and the touch detection method.

In addition, in the following embodiment, a 4-code full-drive driving method is used as an example. That is, a touch drive unit drives all drive channels on the touch sensor at the same time, and for each drive channel, 4 detection codes are sent in one driving period. Of course, the driving method is not specifically limited to the 4-code full-drive driving, and the detection codes sent in one driving period are not specifically limited to 4. In practice, in the present disclosure, any driving method may be used as long as it may achieve having an association relationship with the display control signal.

Figure 3:
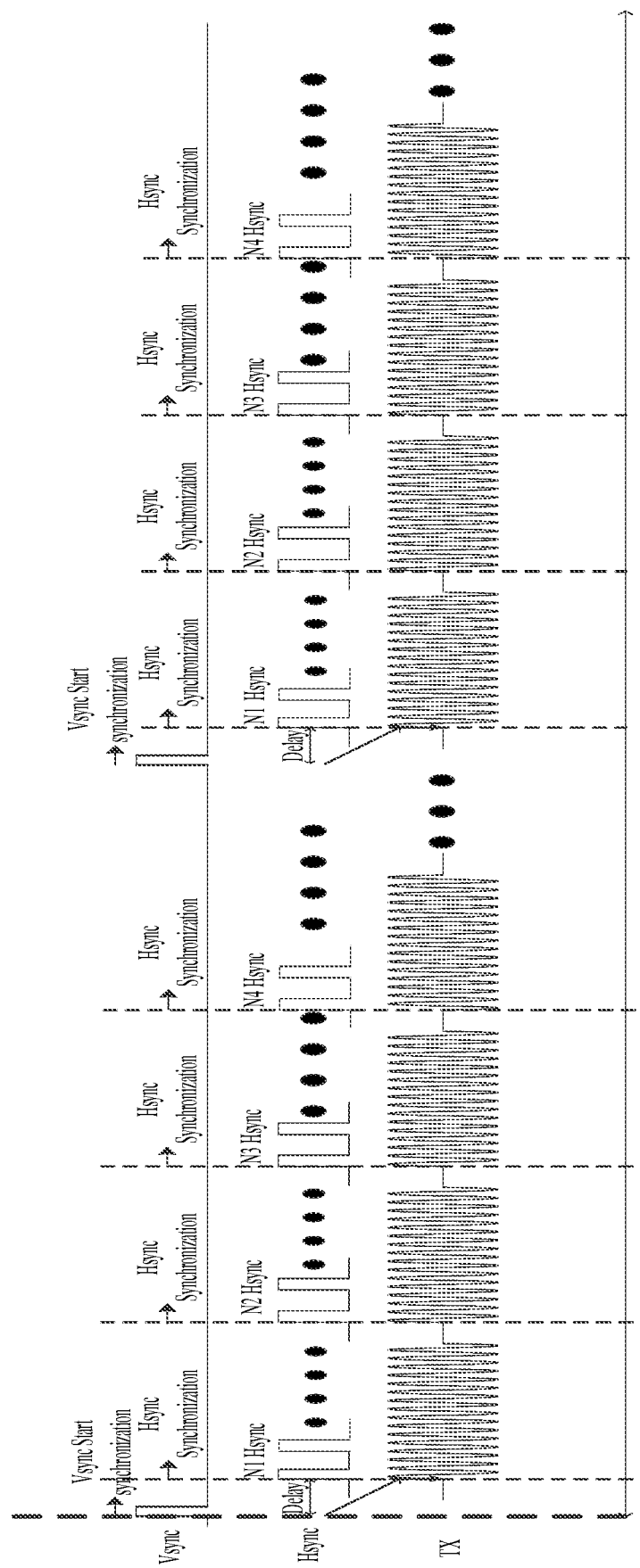
FIG. 3 is a schematic timing diagram of an association relationship in Embodiment 3 of the present disclosure.

FIG. 3 is a schematic timing diagram of an association relationship in Embodiment 3 of the present disclosure; as shown in FIG. 3, the display control signal includes a horizontal synchronization signal Hsync, a vertical synchronization signal Vsync, and one frame of vertical synchronization signal Vsync corresponds to n horizontal synchronization signals Hsync, touch driving performed by the touch drive module has an association relationship with a display control signal of the display drive chip comprises: touch driving performed by the touch drive module has a first association relationship with the vertical synchronization signal Vsync, and has a second association relationship with the n horizontal synchronization signals Hsync.

Further, assume that the touch drive module sequentially sends m detection codes in one driving period to drive one drive channel TX in the touch sensor; the first association relationship is specifically: one frame of vertical synchronization signal corresponds to one driving period, and a time point at which the ith detection code starts to be sent in each driving period lags behind a trigger point in time of one frame of vertical synchronization signal corresponding to the driving period; and the second association relationship is: in each driving period, a time point at which the qth detection code starts to be sent is synchronized with a trigger of the jth horizontal synchronization signal in the n horizontal synchronization signals, and a time point at which the q+1th detection code starts to be sent is synchronized with a trigger of the kth horizontal synchronization signal in the n horizontal synchronization signals, $m \geq i \geq 1$, $m \geq q \geq 1$, j, $k \leq n$, and j<k. Here, it should be noted that i may be equal to q or may not be equal to q.

Exemplarily, if the above 4-code full-drive method is used for driving, m=4, that is, one frame of vertical synchronization signal Vsync corresponds to four detection codes. Therefore, for the current frame of vertical synchronization signal Vsync and the current driving period, in order to realize that the time point at which the first detection code starts to be sent lags behind the trigger point in time of the current frame of vertical synchronization signal Vsync corresponding to the current driving period, the first detection code is sent after a period of delay time "delay" since the trigger point in time of the current frame of vertical synchronization signal Vsync. At the same time, the first detection code is synchronized with the trigger of the N1thhorizontal synchronization signal Hsync in the n horizontal synchronization signals Hsync, and so on, the first detection code is synchronized with the trigger of the N1thhorizontal synchronization signal Hsync in the n horizontal synchronization signals Hsync, the second detection code is synchronized with the trigger of the N2th horizontal synchronization signal Hsync in the n horizontal synchronization signals Hsync, the third detection code is synchronized with the trigger of the N3th horizontal synchronization signal Hsync in the n horizontal synchronization signals Hsync, and the fourth detection code is synchronized with the trigger of the N4th horizontal synchronization signal Hsync in the n horizontal synchronization signals Hsync.

In the present embodiment, in the association relationship between the multiple detection codes and the different horizontal synchronization signals Hsync in the n horizontal synchronization signals Hsync in the above driving period, N1, N2, N3, and N4 are not specifically limited. Under the premise that the touch sensor can be driven normally, as long as it may be ensured that the sending start time of any detection code in one driving period can be synchronized with the trigger of one horizontal synchronization signal Hsync in the n horizontal synchronization signals Hsync. Further, in order to realize the association relationship between the multiple detection codes and the different horizontal synchronization signals Hsync in the n horizontal synchronization signals Hsync in the above driving period, a counter may be set to count the number of rising or falling edges of the horizontal synchronization signal Hsync. When the count value reaches the N1thhorizontal synchronization signal Hsync, the first detection code is sent, when the count value reaches the N2thhorizontal synchronization signal Hsync, the second detection code is sent, when the count value reaches the N3thhorizontal synchronization signal Hsync, the third detection code is sent, and when the count value reaches the N4thhorizontal synchronization signal Hsync, the fourth detection code is sent. Here, by extension, it is equivalent to counting the number of the horizontal synchronization signals Hsync by setting a counter.

For the next frame of vertical synchronization signal Vsync, continue to perform driving in the same driving method, such as 4-code full-drive. For the next frame of vertical synchronization signal Vsync and the next driving period, the association relationship between the detection code, the vertical synchronization signal Vsync, and the horizontal synchronization signal Hsync is the same as in the case of the current frame of vertical synchronization signal Vsync and the current driving period. That is, for the next frame of vertical synchronization signal Vsync, the first detection code is sent after a period of delay time "delay" since the trigger point in time of the next frame of vertical synchronization signal Vsync. At the same time, in the m detection codes and the n horizontal synchronization signals Hsync corresponding to the next frame of vertical synchronization signal Vsync, the first detection code is synchronized with the trigger of the N1thhorizontal synchronization signal Hsync in the n horizontal synchronization signals Hsync, and so on, the first detection code is synchronized with the trigger of the N1thhorizontal synchronization signal Hsync in the n horizontal synchronization signals Hsync, and the second detection code is synchronized with the trigger of the N2th horizontal synchronization signal Hsync in the n horizontal synchronization signals Hsync, the third detection code is synchronized with the trigger of the N3th horizontal synchronization signal Hsync in the n horizontal synchronization signals Hsync, and the fourth detection code is synchronized with the trigger of the N4thhorizontal synchronization signal Hsync in the n horizontal synchronization signals Hsync.

In summary, it can be seen that for two consecutive frames of vertical synchronization signals Vsync and two driving periods, the detection code has a fixed association relationship with the vertical synchronization signal Vsync and the horizontal synchronization signal Hsync. Therefore, when displaying of a display object needs to display multiple frames of display images, display images of the previous and next frames may have the same or at least similar interference. When calculating the touch position, difference is respectively performed on output data of the touch sensor corresponding to the previous and next frames of vertical synchronization signal Vsync. For example, the previous frame of vertical synchronization signal Vsync respectively corresponds to the output data of the touch sensor as a reference, and the output data of the touch sensor corresponding to the previous frame of vertical synchronization signal Vsync is subtracted from the output data of the touch sensor corresponding to the next frame of vertical synchronization signal Vsync, thereby realizing the above-mentioned differential processing for adjacent output signals. Here, when the touch detection module includes the data demodulation unit, the output data of the touch sensor corresponding to the previous and next frames of vertical synchronization signal Vsync may be demodulated to obtain corresponding demodulated data respectively, and difference may be performed on the demodulated data corresponding to the previous and next frames of vertical synchronization signal Vsync. Because touch driving performed by the touch drive module has an association relationship with the display control signal of the display drive chip, if the touch drive module performs touch driving on the touch sensor respectively when displaying the display images of the previous and next frames, output to the touch sensor may be subject to the same or at least similar interference. Therefore, when the touch detection module calculates the touch position, the touch detection module may perform differential processing on the adjacent outputs of the data demodulation unit, thereby canceling or reducing interference from the display system, thereby improving the signal-to-noise ratio of the touch detection system, and further improving the sensitivity of touch detection.

Figure 4:
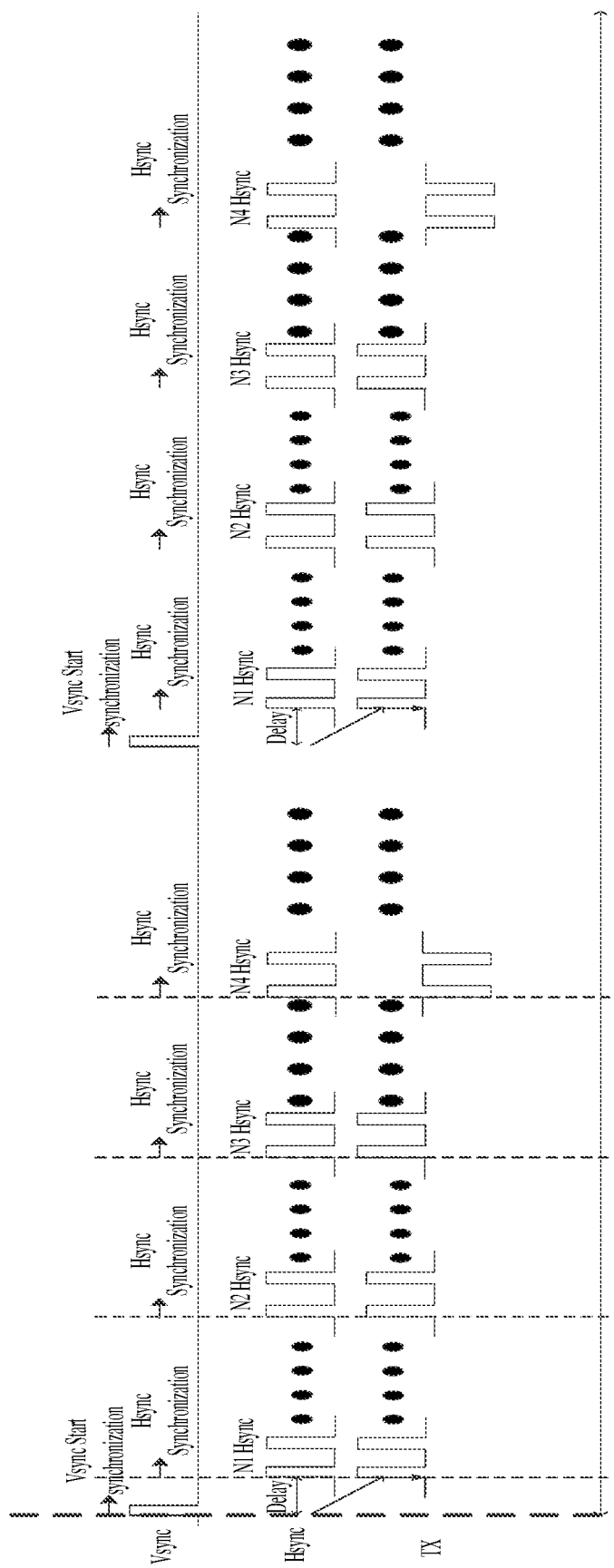
FIG. 4 is a schematic timing diagram of an association relationship in Embodiment 4 of the present disclosure.

FIG. 4 is a schematic timing diagram of an association relationship in Embodiment 4 of the present disclosure; as shown in FIG. 4, the schematic diagram of the timing principle in FIG. 4 is the same as that in Embodiment 3 of FIG. 3 described above. The difference from Embodiment 3 is that the waveform corresponding to the detection code is a rectangular wave instead of a sine wave. The frequency of the waveform of the detection code is the same as the frequency of the horizontal synchronization signal Hsync, and the duty cycle is the same. In practice, the waveform corresponding to the detection code may be any waveform capable of driving, for example, it may also be a triangular wave, and its frequency and duty cycle may be the same as or different from the horizontal synchronization signal Hsync.

Figure 5:
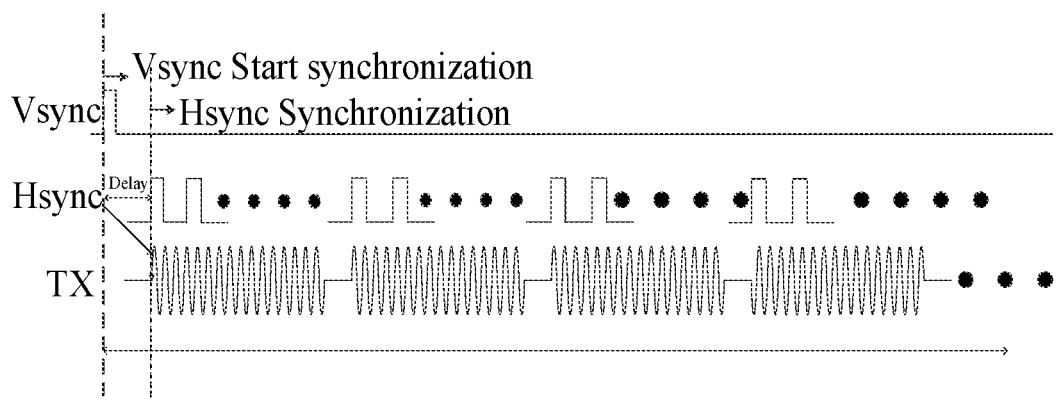
FIG. 5 is a schematic timing diagram of an association relationship in Embodiment 5 of the present disclosure.
Figure 6:
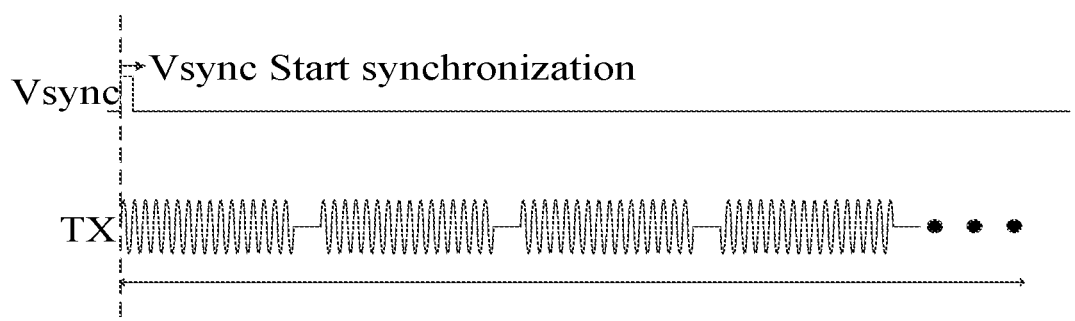
FIG. 6 is a schematic timing diagram of an association relationship in Embodiment 6 of the present disclosure.
Figure 7:
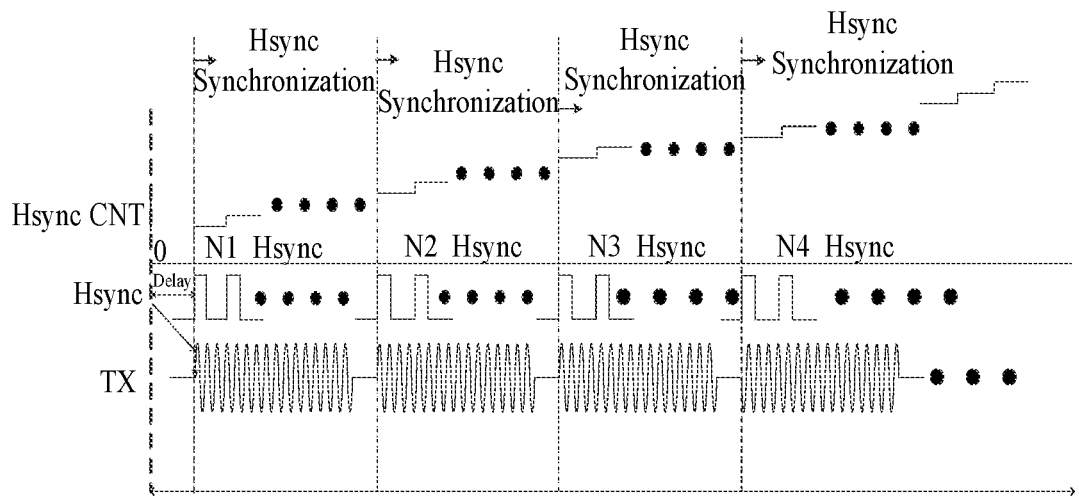
FIG. 7 is a schematic timing diagram of an association relationship in Embodiment 7 of the present disclosure.

In order to clearly illustrate the association relationship, the following FIG. 5 to FIG. 7 only illustrate one frame of vertical synchronization signal and its corresponding n horizontal synchronization signals. If the one frame of vertical synchronization signal is the current frame of vertical synchronization signal, the situation of the next frame of vertical synchronization signal is the same as that of the current frame of vertical synchronization signal.

FIG. 5 is a schematic timing diagram of an association relationship in Embodiment 5 of the present disclosure. As shown in FIG. 5, the display control signal includes a horizontal synchronization signal Hsync, a vertical synchronization signal Vsync, and one frame of vertical synchronization signal Vsync corresponds to n horizontal synchronization signals Hsync, touch driving performed by the touch drive module has an association relationship with a display control signal of the display drive chip comprises: touch driving performed by the touch drive module has a first association relationship with the vertical synchronization signal Vsync, and has a third association relationship with the jth horizontal synchronization signal Hsync in the n horizontal synchronization signals Hsync.

Further, assume that the touch drive module sequentially sends m detection codes in one driving period to drive one drive channel TX in the touch sensor; the first association relationship is: one frame of vertical synchronization signal corresponds to one driving period, and a time point at which the ith detection code starts to be sent in each driving period lags behind a trigger point in time of one frame of vertical synchronization signal corresponding to the driving period; the third association relationship is: in each driving period, a time point at which the qth detection code starts to be sent is synchronized with a trigger of the jth horizontal synchronization signal in the n horizontal synchronization signals; and in each driving period, time points at which detection codes other than the qth detection code start to be sent are synchronized with a clock signal of the touch chip, m≥i≥1, m≥q≥1, and j≤n. In the present embodiment, the synchronization of the time points at which the detection codes other than the qth detection code start to be sent with the clock signal of the touch chip may be realized through the synchronization module. As described above, i may be equal to q or may not be equal to q.

Exemplarily, if the above 4-code full-drive method is used for driving, m=4, that is, one frame of vertical synchronization signal Vsync corresponds to four detection codes. Therefore, for the current frame of vertical synchronization signal Vsync and the current driving period, in order to realize that the time point at which the first detection code starts to be sent lags behind the trigger point in time of the current frame of vertical synchronization signal Vsync corresponding to the current driving period, the first detection code is sent after a period of delay time "delay" since the trigger point in time of one frame of vertical synchronization signal Vsync. At the same time, the first detection code is synchronized with the trigger of the N1thhorizontal synchronization signal Hsync in the n horizontal synchronization signals Hsync, and the second detection code, the third detection code, and the fourth detection code are synchronized with the trigger of the clock signal of the touch chip.

In the present embodiment, in the association relationship between the multiple detection codes and the different horizontal synchronization signals Hsync in the n horizontal synchronization signals Hsync in the one driving period, N1 is not specifically limited. Under the premise that the touch sensor can be driven normally, as long as it may be ensured that the sending start time of the first detection code in one driving period can be synchronized with the trigger of one horizontal synchronization signal Hsync in the n horizontal synchronization signals Hsync, and the remaining detection codes can be synchronized with the trigger of the clock signal of the touch chip.

For the next frame of vertical synchronization signal Vsync, continue to perform driving in the same driving method, such as 4-code full-drive. For the next frame of vertical synchronization signal Vsync and the next driving period, in the next frame of vertical synchronization signal Vsync, the association relationship between the detection code, the vertical synchronization signal Vsync, and the horizontal synchronization signal Hsync is the same as in the case of the current frame of vertical synchronization signal Vsync and the current driving period. That is, for the corresponding m detection codes and the n horizontal synchronization signals Hsync, the time point at which the first detection code starts to be sent lags behind the trigger point in time of the current frame of vertical synchronization signal Vsync, the first detection code is sent after a period of delay time "delay" since the trigger point in time of one frame of vertical synchronization signal Vsync. At the same time, the first detection code is synchronized with the trigger of the N1thhorizontal synchronization signal Hsync in the n horizontal synchronization signals Hsync, and the second detection code, the third detection code, and the fourth detection code are synchronized with the trigger of the clock signal of the touch chip.

In the present embodiment, the principle of canceling interference from a display system is similar to the embodiment shown in FIG. 3 described above. However, for each driving period and each frame of vertical synchronization signal Vsync and its corresponding n horizontal synchronization signals Hsync, since the first detection code in the m detection codes has an association relationship respectively with the frame of vertical synchronization signal Vsync and one horizontal synchronization signal Hsync in the n horizontal synchronization signals Hsync, and the remaining detection codes have association relationships with the clock signal of the touch chip, the implementation cost of the solution is low.

FIG. 6 is a schematic timing diagram of an association relationship in Embodiment 6 of the present disclosure. As shown in FIG. 6, the display control signal is a vertical synchronization signal Vsync, touch driving performed by the touch drive module has an association relationship with a display control signal of the display drive chip comprises:

touch driving performed by the touch drive module has a fourth association relationship with the vertical synchronization signal Vsync.

Further, assume that the touch drive module sequentially sends m detection codes in one driving period to drive one drive channel TX in the touch sensor; the fourth association relationship is: one frame of vertical synchronization signal Vsync corresponds to one driving period, and a time point at which the ith detection code starts to be sent in each driving period is synchronized with a trigger of one frame of vertical synchronization signal Vsync corresponding to the driving period; and, in each driving period, time points at which detection codes other than the ith detection code start to be sent are synchronized with a clock signal of the touch chip, $m \geq i \geq 1$. In the present embodiment, in each driving period, the synchronization of the time point at which the ith detection code starts to be sent with the clock signal of the touch chip may be realized through the synchronization module, or may be realized based on a clock module of the touch chip.

Exemplarily, if the above 4-code full-drive method is used for driving, m=4, that is, one frame of vertical synchronization signal Vsync corresponds to four detection codes. Therefore, for the current frame of vertical synchronization signal Vsync and the current driving period, for example, the time point at which the first detection code starts to be sent is synchronized with the trigger of the current frame of vertical synchronization signal Vsync, and the second detection code, the third detection code, and the fourth detection code are synchronized with the trigger of the clock signal of the touch chip.

For the next frame of vertical synchronization signal Vsync, continue to perform driving in the same driving method, such as 4-code full-drive. For the next frame of vertical synchronization signal Vsync and the next driving period, the association relationship between the detection code and the vertical synchronization signal Vsyncis the same as in the case of the current frame of vertical synchronization signal Vsync and the current driving period. That is, for the next frame of vertical synchronization signal Vsync, the time point at which the first detection code in the m detection codes starts to be sent is synchronized with the trigger of the current frame of vertical synchronization signal Vsync, and the second detection code, the third detection code, and the fourth detection code are synchronized with the trigger of the clock signal of the touch chip.

Here, it should be noted that in other embodiments, the time point at which the detection code of any one of the second detection code, the third detection code, and the fourth detection code starts to be sent may be synchronized with the trigger of the current frame of vertical synchronization signal Vsync.

In the present embodiment, the principle of canceling interference from a display system is similar to the embodiment shown in FIG. 3 described above. However, for each driving period and each frame of vertical synchronization signal Vsync and its corresponding n horizontal synchronization signals Hsync, since the first detection code in the m detection codes only has an association relationship with the frame of vertical synchronization signal Vsync, and the remaining detection codes have association relationships with the clock signal of the touch chip, the implementation is relatively simple, and the cost of implementing the solution may be further reduced. Of course, any one of the m detection codes may be selected to have an association relationship with the frame of vertical synchronization signal Vsync.

FIG. 7 is a schematic timing diagram of an association relationship in Embodiment 7 of the present disclosure. As shown in FIG. 7, if the display control signal is n horizontal synchronization signals Hsync corresponding to one frame of vertical synchronization signal Vsync, touch driving performed by the touch drive module has an association relationship with a display control signal of the display drive chip comprises: touch driving performed by the touch drive module has a second association relationship with the n horizontal synchronization signals Hsync.

Further, if the touch drive module sequentially sends m detection codes in one driving period to drive one drive channel TX in the touch sensor; and the second association relationship is: the n horizontal synchronization signals Hsync correspond to one driving period, in each driving period, a time point at which the ith detection code starts to be sent is synchronized with a trigger of the jth horizontal synchronization signal Hsync in the n horizontal synchronization signals Hsync, and a time point at which the i+1th detection code starts to be sent is synchronized with a trigger of the kth horizontal synchronization signal Hsync in the n horizontal synchronization signals Hsync, $i \leq m$, j, $k \leq n$, and $j<k$.

Specifically, in the present embodiment, a counter Hsync CNT may be configured, to count the number of rising or falling edges of the horizontal synchronization signal Hsync. When the count value satisfies the second association relationship, that is, the touch drive unit is controlled to send a detection code to the touch sensor. Since the number n of the horizontal synchronization signals Hsync corresponding to one frame of vertical synchronization signal Vsync is fixed, for the current frame of synchronization signal, whenever the count value of the counter Hsync CNT reaches n, the counter Hsync CNT is cleared to count at the next frame of synchronization signal. When the count value satisfies the second association relationship again, that is, the touch drive unit is controlled to send a detection code to the touch sensor again. Therefore, it is ensured that for two consecutive frames of vertical synchronization signals Vsync and two driving periods, the detection code only has a fixed association relationship with the horizontal synchronization signal Hsync, so that it may be ensured that the implementing cost of the solution is low, such as, only one data communication line is required between the display drive chip and the touch chip.

In addition, it should be noted that, in the above embodiment, the association relationship between the n horizontal synchronization signals and the m detection codes preferably ensures that the m detection codes may be sent in one frame of vertical synchronization signal corresponding to the n horizontal synchronization signals, thereby ensuring low implementing cost of the solution. However, in practice, the sending of the m detection codes in one driving period may also be allocated in two adjacent frames of vertical synchronization signal, that is, one driving period corresponds to two frames of vertical synchronization signal. Therefore, when the differential processing is performed, if the count value of the counter reaches n, it may indicate that the sending corresponds to one frame of vertical synchronization signal. Therefore, similarly, it may be understood as that the data demodulation unit performs differential processing between the respective corresponding demodulation values in the case of the previous and next every two frames of vertical synchronization signal, thereby canceling or reducing interference from the di splay system.

An embodiment of the present disclosure provides an electronic device, including the touch detection system according to any one of the embodiments of the present disclosure.

The electronic device in the embodiments of the present disclosure takes in various forms, including but not limited to:

(1) Mobile communication device: this type of device is characterized by mobile communication function, and its main goal is to provide voice and data communication. Such terminals include: smart phones (such as iPhone), multimedia cellphones, feature cellphones, low-end cellphones or the like.

(2) Ultra-mobile personal computer device: this type of device belongs to the category of personal computer, has computing and processing functions, and generally also has mobile Internet access characteristics. Such terminals include: PDAs, MIDs, and UMPC devices, such as iPad.

(3) Portable entertainment equipment: this type of device may display and play multimedia content. Such devices include: audio and video players (such as iPod), hand-held game consoles, e-books, smart toys and portable vehicle-mounted navigation devices.

(4) Server: equipment that provides computing services. The server includes a processor 810, hard disk, memory, system bus, etc. The server is similar in architecture to a general-purpose computer. However, due to the need to provide highly reliable services, the server has high requirements in terms of processing power, stability, reliability, security, scalability, and manageability.

(5) Other electronic apparatuses having data interaction functions.

So far, specific embodiments of the present subject matter have been described. Other embodiments are within the scope of the appended claims. In some cases, the actions recited in the claims may be performed in a different order and still achieve the desired result. In addition, the processes depicted in the accompanying drawings do not necessarily require the particular order or sequential order shown to achieve the desired result. In some embodiments, multitasking and parallel processing may be advantageous.

In the 1990s, for a technical improvement, it can be clearly distinguished whether it is an improvement in hardware (for example, an improvement in circuit structures such as diodes, transistors, or switches) or an improvement in software (an improvement on method flow). However, with the development of technology, nowadays, many method flow improvements may be regarded as direct improvements in the hardware circuit structure. Designers mostly always get the corresponding hardware circuit structure by programming the improved method flow into the hardware circuit. Therefore, it cannot be said that an improvement on the method flow cannot be realized by a hardware entity module. For example, a programmable logic device (PLD) (such as a Field Programmable Gate Array (FPGA)) is such an integrated circuit whose logic function is determined by the user programming the device. Designers themselves may program to "integrate" a digital system on a piece of PLD, without having to ask a chip manufacturer to design and manufacture a dedicated integrated circuit chip. Moreover, nowadays, instead of manufacturing integrated circuit chips manually, this programming is also mostly implemented using "logic compiler" software, which is similar to the software compiler used in program development and writing. To compile the original source code, it have to be written in a specific programming language, which is called Hardware Description Language (HDL). There is not only one type of HDL, but many types, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, or RHDL (Ruby Hardware Description Language). Currently the most commonly used are VHDL (Very-High-Speed Integrated Circuit Hardware Description Language) and Verilog. Those skilled in the art should also be clear that as long as the method flow is slightly logical programmed and programmed into the integrated circuit using the above-mentioned several hardware description languages, a hardware circuit that implements the logic method flow may be easily obtained.

A controller may be implemented in any suitable method, for example, the controller may take the form of a microprocessor or processor and a computer-readable medium storing computer-readable program codes (such as software or firmware) executable by the (micro) processor, logic gate, switch, application specific integrated circuit (ASIC), programmable logic controller, and embedded microcontroller. Examples of controllers include, but are not limited to, the following microcontrollers: ARC 625D, Atmel AT91SAM, Microchip PIC18F26K20 and Silicone Labs C8051F320. A memory controller may also be implemented as part of the control logic for the memory. Those skilled in the art also know that, in addition to implementing the controller in the purely computer-readable program code method, it is entirely possible to logical program method steps to make the controller achieve the same functions in the form of logic gate, switch, application specific integrated circuit, programmable logic controller, and embedded microcontroller. Therefore, such controller may be regarded as a hardware component, and an apparatus for implementing various functions included in the controller may also be regarded as a structure within the hardware component. Or even, the apparatus for implementing various functions may be regarded as a structure that may be both a software module implementing the method and a hardware component.

The system, apparatus, module, or unit described in the foregoing embodiments may be specifically implemented by a computer chip or entity, or by a product having a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, when describing the above apparatus, the functions are divided into various units and described separately. Of course, when implementing the present disclosure, the functions of the units may be implemented in the same software or multiple software and/or hardware.

Those skilled in the art should understand that the embodiments of the present disclosure may be provided as a method, a system, or a computer program product. Therefore, the present disclosure may take the form of an entirely hardware embodiment, an entirely software embodiment, or an embodiment combining software and hardware aspects. Moreover, the present disclosure may take the form of a computer program product implemented on one or more computer-usable storage mediums (including but not limited to disk memory, CD-ROM, optical memory, etc.) containing computer-usable program codes.

The present disclosure is described with reference to flowcharts and/or block diagrams of the method, device (system), and computer program product according to the embodiments of the present disclosure. It should be understood that each flow and/or block in the flowcharts and/or block diagrams, and combinations of flows and/or blocks in the flowcharts and/or block diagrams may be implemented by computer program instructions. These computer program instructions may be provided to a processor of a general-purpose computer, dedicated computer, embedded processor, or other programmable data processing device to produce a machine, such that instructions executed by the processor of the computer or other programmable data processing device produce an apparatus for implementing the functions specified in one or more flows in the flowcharts and/or one or more blocks in the block diagrams.

These computer program instructions may also be stored in a computer-readable memory capable of directing the computer or other programmable data processing device to work in a specific method such that the instructions stored in the computer-readable memory produce a product that includes an instruction apparatus that implements the functions specified in one or more flows in the flowcharts and/or one or more blocks in the block diagrams.

These computer program instructions may also be loaded onto the computer or other programmable data processing device, such that a series of operation steps may be performed on the computer or other programmable device to produce a computer-implemented process, such that the instructions executed on the computer or other programmable device provide steps for implementing the functions specified in one or more flows in the flowcharts and/or one or more blocks in the block diagrams.

In a typical configuration, a computing device includes one or more processors (CPUs), input/output interfaces, network interfaces, and memories.

Memory may include non-persistent memory, random access memory (RAM), and/or non-volatile memory in computer-readable medium, such as read-only memory (ROM) or flash read-only memory (flash RAM). Memory is an example of the computer-readable medium.

Computer-readable medium includes both permanent and non-persistent, removable and non-removable media. Information may be stored by any method or technology. Information may be computer-readable instructions, data structures, program modules, or other data. Examples of computer storage mediums include, but are not limited to, phase-change random access memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only disc read-only memory (CD-ROM), digital versatile disc (DVD) or other optical storage, magnetic tape cartridges, magnetic tape, magnetic disk storage or other magnetic storage devices, or any other non-transmission medium that may be used to store information that can be accessed by the computing device. As defined herein, the computer-readable medium does not include temporary computer-readable media (transitory media) such as modulated data signals and carrier waves.

It should also be noted that the terms "including," "comprising," or any other variation thereof are intended to encompass non-exclusive inclusion, such that a process, method, product, or device that includes a series of elements includes not only those elements but also other elements not explicitly listed, or those that are inherent to such process, method, product, or device. Without more restrictions, the elements defined by the sentence "including a . . . " do not exclude the existence of other identical elements in the process, method, product or device including the said elements.

Those skilled in the art should understand that the embodiments of the present disclosure may be provided as a method, a system, or a computer program product. Therefore, the present disclosure may take the form of an entirely hardware embodiment, an entirely software embodiment, or an embodiment combining software and hardware aspects. Moreover, the present disclosure may take the form of a computer program product implemented on one or more computer-usable storage mediums (including but not limited to disk memory, CD-ROM, optical memory, etc.) containing computer-usable program codes.

The present disclosure may be described in the general context of computer-executable instructions executed by the computer, such as program modules. Generally, program modules include routines, programs, objects, components, data structures, etc. that perform specific transactions or implement specific abstract data types. The present disclosure may also be practiced in distributed computing environments in which transactions are performed by remote processing devices connected through communication networks. In a distributed computing environment, program modules may be located at local and remote computer storage mediums, including storage devices.

The above description is merely embodiments of the present disclosure and is not intended to limit the present disclosure. For those skilled in the art, the present disclosure may have various modifications and changes. Any modification, equivalent replacement, improvement, etc. made within the spirit and principle of the present disclosure shall be included in the scope of the claims of the present disclosure.

What is claimed is:

1. A touch control chip, comprising: a synchronization module, a touch drive module, and a touch detection module, the synchronization module being electrically connected to a display drive chip, and configured to enable touch driving performed by the touch drive module to have an association relationship with a display control signal of the display drive chip; the synchronization module being electrically connected to the touch drive module, to enable the touch drive module to drive a touch sensor under control of the display control signal; and the touch detection module being electrically connected to the touch sensor, and configured to detect an output signal of the touch sensor to determine a touch position, wherein the display control signal comprises a horizontal synchronization signal, a vertical synchronization signal, and one frame of vertical synchronization signal corresponds to n horizontal synchronization signals, the touch driving performed by the touch drive module having an association relationship with a display control signal of the display drive chip comprises: the touch driving performed by the touch drive module having a first association relationship with the vertical synchronization signal, and having a second association relationship with the n horizontal synchronization signals; and wherein the chip further comprises a counter, being configured to count a number of the horizontal synchronization signals in real time, and the touch drive module is further configured to sequentially send m detection codes in one driving period to drive one drive channel in the touch sensor; the first association relationship is: one frame of vertical synchronization signal corresponds to one driving period, and a time point at which an i-th detection code starts to be sent in each driving period lags behind a trigger point in time of one frame of vertical synchronization signal corresponding to the driving period; and the second association relationship is: in each driving period, a time point at which a q-th detection code starts to be sent is synchronized with a trigger of a j-th horizontal synchronization signal in the n horizontal synchronization signals, and a time point at which a (q+1)-th detection code starts to be sent is synchronized with a trigger of a k-th horizontal synchronization signal in the n horizontal synchronization signals, $m \geq i \geq 1$, $m \geq q \geq 1$, $m \geq 2$, $1 \leq j \leq n$, $j < k \leq n$, and $n \geq 2$; or wherein the display control signal comprises a horizontal synchronization signal, a vertical synchronization signal, and one frame of vertical synchronization signal corresponds to n horizontal synchronization signals, the touch driving performed by the touch drive module having an association relationship with a display control signal of the display drive chip comprises: the touch driving performed by the touch drive module having a first association relationship with the vertical synchronization signal, and having a third association relationship with a j-th horizontal synchronization signal in the n horizontal synchronization signals; and wherein the chip further comprises a counter, being configured to count a number of the horizontal synchronization signals in real time, and the touch drive module is further configured to sequentially send m detection codes in one driving period to drive one drive channel in the touch sensor; the first association relationship is: one frame of vertical synchronization signal corresponds to one driving period, and a time point at which an i-th detection code starts to be sent in each driving period lags behind a trigger point in time of one frame of vertical synchronization signal corresponding to the driving period; the third association relationship is: in each driving period, a time point at which a q-th detection code starts to be sent is synchronized with a trigger of a j-th horizontal synchronization signal in the n horizontal synchronization signals; and in each driving period, time points at which detection codes other than the q—the detection code start to be sent are synchronized with a clock signal of the touch chip, $m \geq i \geq 1$, $m \geq q \geq 1$, $1 \leq j \leq n$, $n \geq 1$, and $m \geq 2$; or wherein the display control signal is a vertical synchronization signal, the touch driving performed by the touch drive module having an association relationship with a display control signal of the display drive chip comprises: the touch driving performed by the touch drive module having a fourth association relationship with the vertical synchronization signal, and wherein the touch drive module is further configured to sequentially send m detection codes in one driving period to drive one drive channel in the touch sensor; the fourth association relationship is: one frame of vertical synchronization signal corresponds to one driving period, and a time point at which an i-th detection code starts to be sent in each driving period is synchronized with a trigger of the one frame of vertical synchronization signal corresponding to the driving period; and in each driving period, time points at which detection codes other than the i-th detection code start to be sent are synchronized with a clock signal of the touch chip, $m \geq i \geq 1$ and $m \geq 2$; or wherein the display control signal is n horizontal synchronization signals corresponding to one frame of vertical synchronization signal, the touch driving performed by the touch drive module having an association relationship with a display control signal of the display drive chip comprise: the touch driving performed by the touch drive module having a second association relationship with the n horizontal synchronization signals, and wherein the chip further comprises a counter, being configured to count a number of the horizontal synchronization signals in real time, and the touch drive module is further configured to sequentially send m detection codes in one driving period to drive one drive channel in the touch sensor; and the second association relationship is: the n horizontal synchronization signals correspond to one driving period, and in each driving period, a time point at which an i-th detection code starts to be sent is synchronized with a trigger of a j-th horizontal synchronization signal in the n horizontal synchronization signals, and a time point at which an (i+1)-th detection code starts to be sent is synchronized with a trigger of a k-th horizontal synchronization signal in the n horizontal synchronization signals, $1 \leq i \leq m$, $m \geq 2$, $1 \leq j \leq n$, $j < k \leq n$, and $n \geq 2$.

2. A touch control chip, comprising: a synchronization module, a touch drive module, and a touch detection module, the synchronization module being electrically connected to a display drive chip, and configured to enable touch driving performed by the touch drive module to have an association relationship with a display control signal of the display drive chip; the synchronization module being electrically connected to the touch drive module, to enable the touch drive module to drive a touch sensor under control of the display control signal; and the touch detection module being electrically connected to the touch sensor, and configured to detect an output signal of the touch sensor to determine a touch position, wherein the display control signal comprises a horizontal synchronization signal, a vertical synchronization signal, and one frame of vertical synchronization signal corresponds to n horizontal synchronization signals, the touch driving performed by the touch drive module having an association relationship with a display control signal of the display drive chip comprises: the touch driving performed by the touch drive module having a first association relationship with the vertical synchronization signal, and having a second association relationship with the n horizontal synchronization signals; and wherein the chip further comprises a counter, being configured to count a number of the horizontal synchronization signals in real time, and the touch drive module is further configured to sequentially send m detection codes in one driving period to drive one drive channel in the touch sensor; the first association relationship is: one frame of vertical synchronization signal corresponds to one driving period, and a time point at which an i-th detection code starts to be sent in each driving period lags behind a trigger point in time of one frame of vertical synchronization signal corresponding to the driving period; and the second association relationship is: in each driving period, a time point at which a q-th detection code starts to be sent is synchronized with a trigger of a j-th horizontal synchronization signal in the n horizontal synchronization signals, and a time point at which a (q+1)-th detection code starts to be sent is synchronized with a trigger of a k-th horizontal synchronization signal in the n horizontal synchronization signals, m≥i≥1, m≥q≥1, m≥2, 1≤j≤n, j<k≤n, and n≥2; or wherein the display control signal comprises a horizontal synchronization signal, a vertical synchronization signal, and one frame of vertical synchronization signal corresponds to n horizontal synchronization signals, the touch driving performed by the touch drive module having an association relationship with a display control signal of the display drive chip comprises: the touch driving performed by the touch drive module having a first association relationship with the vertical synchronization signal, and having a third association relationship with a j-th horizontal synchronization signal in the n horizontal synchronization signals; and wherein the chip further comprises a counter, being configured to count a number of the horizontal synchronization signals in real time, and the touch drive module is further configured to sequentially send m detection codes in one driving period to drive one drive channel in the touch sensor; the first association relationship is: one frame of vertical synchronization signal corresponds to one driving period, and a time point at which an i-th detection code starts to be sent in each driving period lags behind a trigger point in time of one frame of vertical synchronization signal corresponding to the driving period; the third association relationship is: in each driving period, a time point at which a q-th detection code starts to be sent is synchronized with a trigger of a j-th horizontal synchronization signal in the n horizontal synchronization signals; and in each driving period, time points at which detection codes other than the q—the detection code start to be sent are synchronized with a clock signal of the touch chip, m≥i≥1, m≥q≥1, 1≤j≤n, n≥1, and m≥2; or wherein the display control signal is a vertical synchronization signal, the touch driving performed by the touch drive module having an association relationship with a display control signal of the display drive chip comprises: the touch driving performed by the touch drive module having a fourth association relationship with the vertical synchronization signal, and wherein the touch drive module is further configured to sequentially send m detection codes in one driving period to drive one drive channel in the touch sensor; the fourth association relationship is: one frame of vertical synchronization signal corresponds to one driving period, and a time point at which an i-th detection code starts to be sent in each driving period is synchronized with a trigger of the one frame of vertical synchronization signal corresponding to the driving period; and in each driving period, time points at which detection codes other than the i-th detection code start to be sent are synchronized with a clock signal of the touch chip, m≥i≥1 and m≥2; or wherein the display control signal is n horizontal synchronization signals corresponding to one frame of vertical synchronization signal, the touch driving performed by the touch drive module having an association relationship with a display control signal of the display drive chip comprise: the touch driving performed by the touch drive module having a second association relationship with the n horizontal synchronization signals, and wherein the chip further comprises a counter, being configured to count a number of the horizontal synchronization signals in real time, and the touch drive module is further configured to sequentially send m detection codes in one driving period to drive one drive channel in the touch sensor; and the second association relationship is: the n horizontal synchronization signals correspond to one driving period, and in each driving period, a time point at which an i-th detection code starts to be sent is synchronized with a trigger of a j-th horizontal synchronization signal in the n horizontal synchronization signals, and a time point at which an (i+1)-th detection code starts to be sent is synchronized with a trigger of a k-th horizontal synchronization signal in the n horizontal synchronization signals, 1≤i≤m, m≥2, 1≤j≤n, j<k≤n, and n≥2, and wherein the touch detection module is further configured to perform differential processing on output signals of the touch sensor corresponding to the two adjacent frames of vertical synchronization signal to determine the touch position.

3. An electronic device, comprising a touch control chip, wherein the touch control chip comprises a synchronization module, a touch drive module, and a touch detection module, the synchronization module being electrically connected to a display drive chip, and configured to enable touch driving performed by the touch drive module to have an association relationship with a display control signal of the display drive chip; the synchronization module being electrically connected to the touch drive module, to enable the touch drive module to drive a touch sensor under control of the display control signal; and the touch detection module being electrically connected to the touch sensor, and configured to detect an output signal of the touch sensor to determine a touch position, wherein the display control signal comprises a horizontal synchronization signal, a vertical synchronization signal, and one frame of vertical synchronization signal corresponds to n horizontal synchronization signals, the touch driving performed by the touch drive module having an association relationship with a display control signal of the display drive chip comprises: the touch driving performed by the touch drive module having a first association relationship with the vertical synchronization signal, and having a second association relationship with the n horizontal synchronization signals; and wherein the chip further comprises a counter, being configured to count a number of the horizontal synchronization signals in real time, and the touch drive module is further configured to sequentially send m detection codes in one driving period to drive one drive channel in the touch sensor; the first association relationship is: one frame of vertical synchronization signal corresponds to one driving period, and a time point at which an i-th detection code starts to be sent in each driving period lags behind a trigger point in time of one frame of vertical synchronization signal corresponding to the driving period; and the second association relationship is: in each driving period, a time point at which a q-th detection code starts to be sent is synchronized with a trigger of a j-th horizontal synchronization signal in the n horizontal synchronization signals, and a time point at which a (q+1)-th detection code starts to be sent is synchronized with a trigger of a k-th horizontal synchronization signal in the n horizontal synchronization signals, m≥i≥1, m≥q≥1, m≥2, 1≤j≤n, j<k≤n, and n≥2; or wherein the display control signal comprises a horizontal synchronization signal, a vertical synchronization signal, and one frame of vertical synchronization signal corresponds to n horizontal synchronization signals, the touch driving performed by the touch drive module having an association relationship with a display control signal of the display drive chip comprises: the touch driving performed by the touch drive module having a first association relationship with the vertical synchronization signal, and having a third association relationship with a j-th horizontal synchronization signal in the n horizontal synchronization signals; and wherein the chip further comprises a counter, being configured to count a number of the horizontal synchronization signals in real time, and the touch drive module is further configured to sequentially send m detection codes in one driving period to drive one drive channel in the touch sensor; the first association relationship is: one frame of vertical synchronization signal corresponds to one driving period, and a time point at which an i-th detection code starts to be sent in each driving period lags behind a trigger point in time of one frame of vertical synchronization signal corresponding to the driving period; the third association relationship is: in each driving period, a time point at which a q-th detection code starts to be sent is synchronized with a trigger of a j-th horizontal synchronization signal in the n horizontal synchronization signals; and in each driving period, time points at which detection codes other than the q—the detection code start to be sent are synchronized with a clock signal of the touch chip, $m \geq i \geq 1$, $m \geq q \geq 1$, $1 \leq j \leq n$, $n \geq 1$, and $m \geq 2$; or wherein the display control signal is a vertical synchronization signal, the touch driving performed by the touch drive module having an association relationship with a display control signal of the display drive chip comprises: the touch driving performed by the touch drive module having a fourth association relationship with the vertical synchronization signal, and wherein the touch drive module is further configured to sequentially send m detection codes in one driving period to drive one drive channel in the touch sensor; the fourth association relationship is: one frame of vertical synchronization signal corresponds to one driving period, and a time point at which an i-th detection code starts to be sent in each driving period is synchronized with a trigger of the one frame of vertical synchronization signal corresponding to the driving period; and in each driving period, time points at which detection codes other than the i-th detection code start to be sent are synchronized with a clock signal of the touch chip, $m \geq i \geq 1$ and $m \geq 2$; or wherein the display control signal is n horizontal synchronization signals corresponding to one frame of vertical synchronization signal, the touch driving performed by the touch drive module having an association relationship with a display control signal of the display drive chip comprise: the touch driving performed by the touch drive module having a second association relationship with the n horizontal synchronization signals, and wherein the chip further comprises a counter, being configured to count a number of the horizontal synchronization signals in real time, and the touch drive module is further configured to sequentially send m detection codes in one driving period to drive one drive channel in the touch sensor; and the second association relationship is: the n horizontal synchronization signals correspond to one driving period, and in each driving period, a time point at which an i-th detection code starts to be sent is synchronized with a trigger of a j-th horizontal synchronization signal in the n horizontal synchronization signals, and a time point at which an (i+1)-th detection code starts to be sent is synchronized with a trigger of a k-th horizontal synchronization signal in the n horizontal synchronization signals, $1 \leq i \leq m$, $m \geq 2$, $1 \leq j \leq n$, $j < k \leq n$, and $n \geq 2$.

* * * * *